US012283735B2

(12) United States Patent
Wu et al.

(10) Patent No.: US 12,283,735 B2
(45) Date of Patent: Apr. 22, 2025

(54) GAPLESS FERRITE STRUCTURE FOR CIRCULATOR OR ISOLATOR

(71) Applicant: Universal Microwave Technology, Inc., Keelung (TW)

(72) Inventors: Tung-Yi Wu, Keelung (TW); Sheng-Feng Yeh, New Taipei (TW); Wun-Kai Wu, Yilan County (TW); Sung-Fan Liu, New Taipei (TW); Chien-Chih Lee, Taipei (TW); Jen-Ti Peng, Keelung (TW)

(73) Assignee: Universal Microwave Technology, Inc., Keelung (TW)

( * ) Notice: Subject to any disclaimer, the term of this patent is extended or adjusted under 35 U.S.C. 154(b) by 296 days.

(21) Appl. No.: 18/071,646

(22) Filed: Nov. 30, 2022

(65) Prior Publication Data

US 2024/0177905 A1 May 30, 2024

(51) Int. Cl.
*H01P 1/39* (2006.01)
*H01F 7/00* (2006.01)
*H01P 1/36* (2006.01)
*H01P 1/38* (2006.01)

(52) U.S. Cl.
CPC ................. *H01P 1/39* (2013.01); *H01F 7/00* (2013.01); *H01P 1/36* (2013.01); *H01P 1/38* (2013.01)

(58) Field of Classification Search
CPC .... H01P 1/38; H01P 1/39; H01P 1/383; H01P 1/36; H01P 1/32; H01F 7/00
See application file for complete search history.

(56) References Cited

U.S. PATENT DOCUMENTS 5,285,174 A * 2/1994 Al-Bundak ............... H01P 1/39 333/1.1
2015/0270594 A1* 9/2015 Helszajn .................. H01P 1/39 333/1.1

* cited by examiner

*Primary Examiner* — Andrea Lindgren Baltzell
*Assistant Examiner* — Abigail Amir Yaldo
(74) *Attorney, Agent, or Firm* — Ying-Ting Chen; Law Office of Michael Chen

(57) ABSTRACT

A gapless ferrite structure for circulator or isolator includes a first base having a first flange and a first limit slot surrounded by the first flange, a second base having a second flange and a second limit slot surrounded by the second flange, a ferrite with two ends accommodated in the first limit slot and the second limit slot respectively, two limit magnets installed on the first base and the second base respectively and configured to be corresponsive to the ferrite to generate an attraction force on the ferrite, and two sealing units configured between an end of the ferrite and the first limit slot and between the other end of the ferrite and the second limit slot respectively. In this way, a gapless structure can be formed on a signal transmission path in a circulator or isolator.

7 Claims, 5 Drawing Sheets

A-A

GAPLESS FERRITE STRUCTURE FOR CIRCULATOR OR ISOLATOR

FIELD OF THE INVENTION

The present disclosure relates to the technical field of gapless ferrite structures, in particular to a gapless ferrite structure for circulator or isolator.

BACKGROUND OF THE INVENTION

Circulator or isolator applied in communication system equipment is a device for processing high-frequency microwave signals, isolating a received signal and a transmitted signal from each other, and preventing the received and transmitted signals from interfering with each other. In general, a ferrite component is arranged at the intersection of three channels of the circulator or isolator. Under a certain magnetic flux condition, the ferrite component of the circulator or isolator has the features of low loss in the forward path and high rejection in the reverse path.

However, the conventional circulator or isolator structure has gaps formed between the ferrite component and the metal wall surface of the channel, so that it is easy to excite trace signals of other modes and impose an adverse effect on high frequency signal transmission systems. As a result, the conventional circulator or isolator is unable to meet the requirements of high-performance systems.

SUMMARY OF THE INVENTION

Therefore, it is a primary objective of the present disclosure to provide a gapless ferrite structure for circulator or isolator with the features of convenient assembly and positioning and high electrical performance, which is suitable for high-performance systems.

To achieve the aforementioned and other objectives, this disclosure provides an embodiment of a gapless ferrite structure for circulator or isolator that includes a first base, a second base, a ferrite, two limit magnets and two sealing units, wherein the first base includes a first flange disposed on an inner wall surface of the first base and a first limit slot surrounded by the first flange; the second base is assembled with the first base to form an internal space and includes a second flange disposed on the inner wall surface of the second base and a second limit slot surrounded by the second flange; two ends of the ferrite are accommodated in the first limit slot and the second limit slot respectively; the two limit magnets are installed on the first base and the second base respectively and configured to be corresponsive to the ferrite for generating an attraction force on the ferrite; and the two sealing units are configured between an end of the ferrite and the first limit slot and between the other end of the ferrite and the second limit slot respectively.

In an embodiment applied to the circulator or isolator gapless ferrite structure, the first limit slot with the first flange formed on the inner wall surface of the first base and the second flange formed on the inner wall surface of the second base are provided for accommodating the two ends of the ferrite respectively, so that a gapless structure can be formed on the signal transmission path to meet the application requirements of the high-performance communication system equipment. In addition, the gapless structure can also isolate metal foreign substances from being adsorbed onto the ferrite.

DESCRIPTION OF THE PREFERRED EMBODIMENTS

Figure 1:
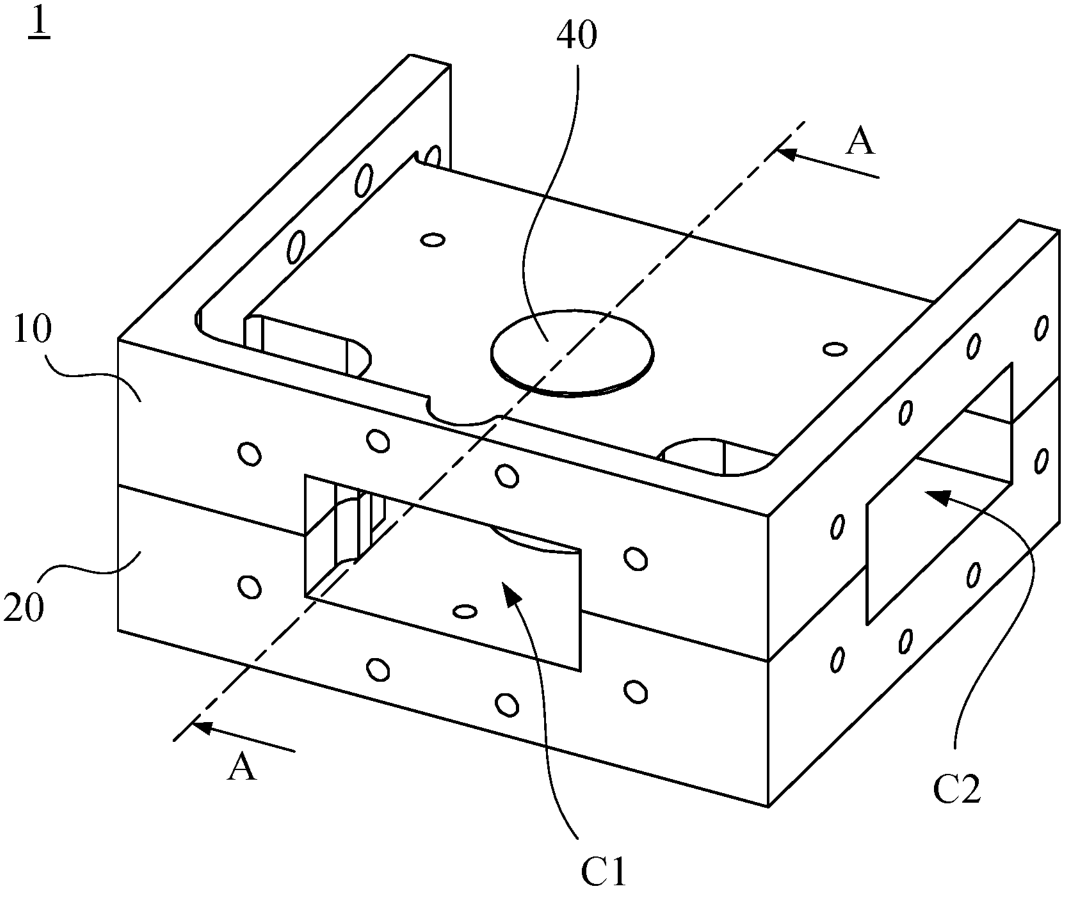
FIG. 1 is a perspective view of a gapless ferrite structure for circulator or isolator in accordance with an embodiment of this disclosure.
Figure 2:
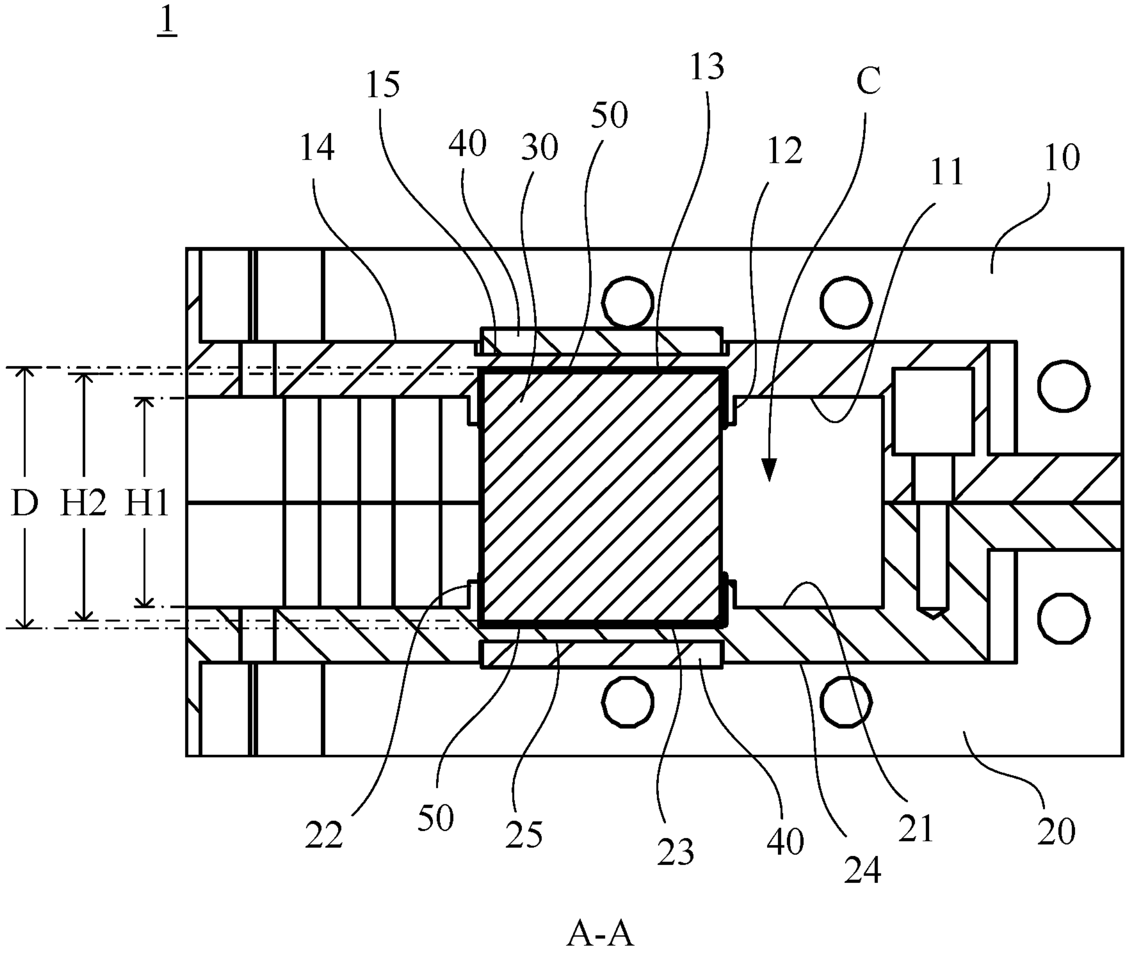
FIG. 2 is a cross-sectional view of Section A-A of the ferrite structure as depicted in FIG. 1.

The technical characteristics, contents, advantages and effects of the present invention will become apparent from the following detailed description taken with the accompanying drawing.

In the description of this disclosure, it should be understood that the terms “a” and “one” are used as a unit, an element and a component for the description of this specification to facilitate the description and provide a general meaning to the scope of the disclosure, so that both “a” and “one” refer to one or at least one including an odd or even number, unless otherwise specified.

In the description of this disclosure, the terms “comprising”, “including”, “having” or any other similar terminologies are intended to cover non-exclusive contents. These terms are not limited to the elements listed in the specification only, but also include other usually inherent elements, structures, products or devices which are not listed specifically.

In the description of this disclosure, the terms “first” and “second” are used for simplifying the description only, but should not be understood as indicating or implying the relative importance or the quantity of the technical characteristics as implied or indicated. Therefore, the characteristic limiting the “first” and the “second” may indicate or imply one or more characteristics, and these terms can be used interchangeably without affecting the embodiment disclosed herein or other relevant embodiments.

With reference to FIGS. 1 to 5 for the perspective view of a gapless ferrite structure for circulator or isolator, the cross-sectional view of Section A-A of the gapless ferrite structure, the exploded view of the gapless ferrite structure, the other exploded view of the gapless ferrite structure another, and the top view of the gapless ferrite structure for circulator or isolator in accordance with an embodiment of this disclosure respectively, the ferrite structure 1 is used as a ferrite in an apparatus such as a circulator or an isolator and configured in a gapless manner. The ferrite structure 1 includes a first base 10, a second base 20, a ferrite 30, two limit magnets 40 and two sealing units 50.

The first base 10 includes a first flange 12 disposed on an inner wall surface 11 of the first base 10 and a first limit slot 13 surrounded by the first flange 12. The second base 20 is assembled with the first base 10 to form an internal space C between the first base 10 and the second base 20. The second base 20 includes a second flange 22 disposed on an inner wall surface 21 of the second base 20 and a second limit slot 23 surrounded by the second flange 22.

Figure 3:
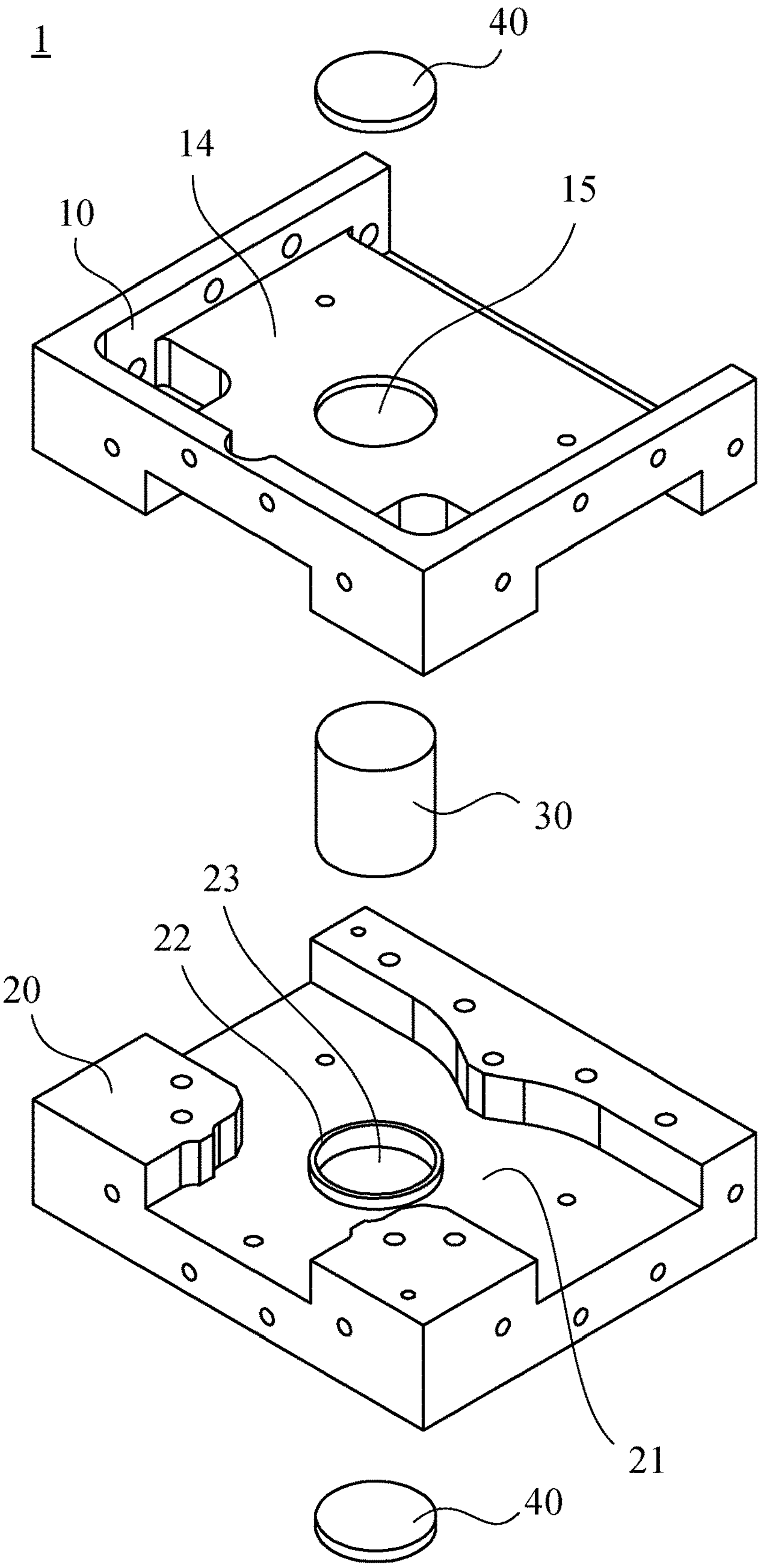
FIG. 3 is an exploded view of a gapless ferrite structure for circulator or isolator gapless ferrite structure for circulator or isolator in accordance with an embodiment of this disclosure.
Figure 4:
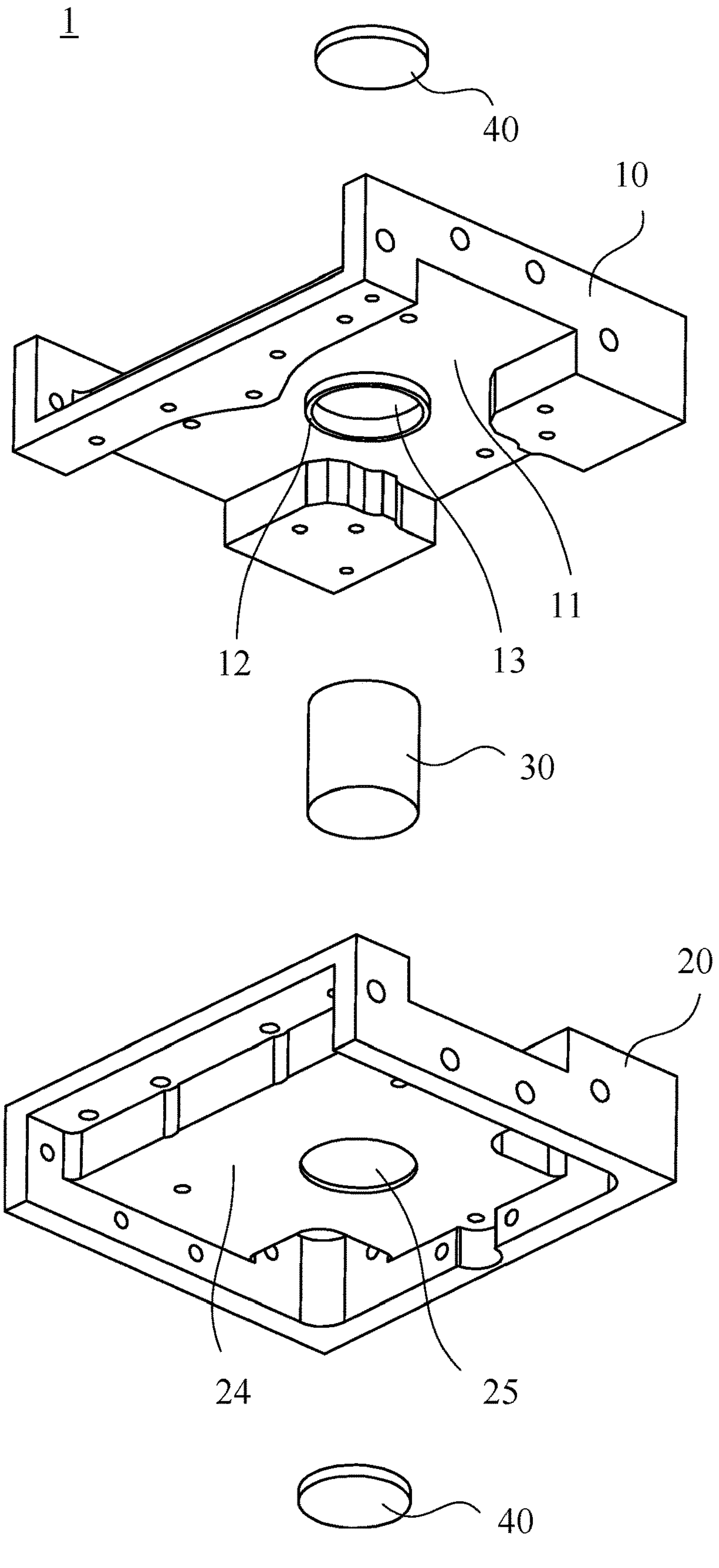
FIG. 4 is another exploded view of a gapless ferrite structure for circulator or isolator gapless ferrite structure for circulator or isolator in accordance with an embodiment of this disclosure.
Figure 5:
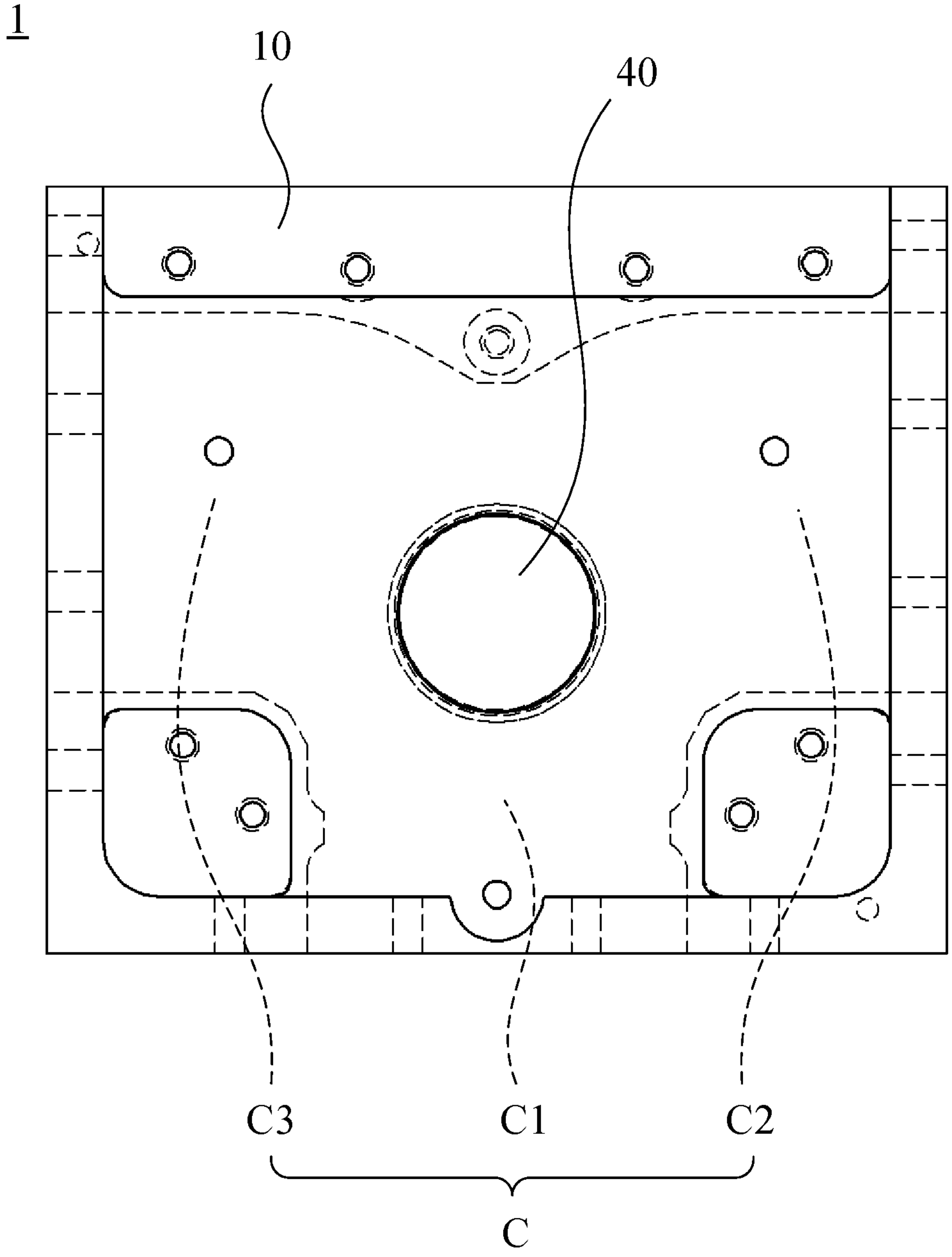
FIG. 5 is a top view of a gapless ferrite structure for showing circulator or isolator in accordance with an embodiment of this disclosure.

The ferrite 30 is installed in the internal space C between the first base 10 and the second base 20, and two ends of the ferrite 30 are accommodated in the first limit slot 13 and the second limit slot 23 respectively. In the internal space C, a plurality of channels C1, C2, C3 (as shown in FIG. 5) is formed for transmitting signals, and the ferrite 30 is configured on the signal transmission path and disposed at the intersection of the channels C1, C2, C3. In an embodiment as shown in FIGS. 3 and 4, the ferrite 30 is a cylinder, but this disclosure is not limited to this arrangement only, and in other embodiments, the ferrite can be in other shapes. For example, the ferrite can also be a polygonal columnar structure, correspondingly, the first flange and the first limit slot surrounded by the first flange, and the second flange and the second limit slot surrounded by the second flange can be in the shapes corresponding to the contour shapes of the two ends of the ferrite.

The two limit magnets 40 are installed on the first base 10 and the second base 20 respectively and configured to be corresponsive to the ferrite 30 for generating an attraction force on the ferrite 30. For example, a limit magnet 40 is installed on an outer wall surface 14 of the first base 10 and configured to be corresponsive to the inner ferrite 30, and there is a magnetic attraction force between the limit magnet 40 and the ferrite 30, so that the ferrite 30 is positioned. Similarly, another limit magnet 40 is installed on an outer wall surface 24 of the second base 20 and configured to be corresponsive to the inner ferrite 30, and there is a magnetic attraction force between the limit magnet 40 and the ferrite 30, so that the ferrite 30 is positioned.

The two sealing units 50 are configured between an end of the ferrite 30 and the first limit slot 13 and between the other end of the ferrite 30 and the second limit slot 23 respectively to fill the gap of the structure and further fix the ferrite 30 in position.

Accordingly, the first flange 12 and the second flange 22 form a corresponding structure that protrudes and surrounds the two ends of the ferrite 30, and the filling by the sealing unit 50 can form a gapless path for signal transmission. At the same time, the first flange 12 and the second flange 22 can play the role of guiding and positioning the ferrite 30 in the production/assembly process, thereby optimizing the assembly process and reliability. In addition, the first flange 12 and the first limit slot 13 surrounded by the first flange 12, and the second flange 22 and the second limit slot 23 surrounded by the second flange 22 define the area where the sealing unit 50 is applied, and precisely control the quantity and position of the adhesive applied as the sealing unit 50. In addition, In addition, the first flange 12 and the second flange 22 can also isolate the unexpected metal foreign substances produced in the internal space C during operation or use. At the same time, the first flange 12 and the second flange 22 also increase the distance between these metal foreign substances and the limit magnet 40 and form a barrier for attenuating the magnetic force, which in turn reduces the magnetic attraction force to these metal foreign substances significantly.

Therefore, the method of sticking the Teflon layer between the two end surfaces of the ferrite and the inner sidewall of the channel by adhesive requires many additional precise controls in the adhesion process. For example, the thickness of the ferrite, the quantity of adhesive used and the thickness formed by the adhesive must be precisely controlled in the process in order to securely combine the soft elastic material (Teflon and adhesive) with the inelastic material (ferrite and base). The configuration of this embodiment can further optimize the assembly process and improve reliability. At the same time, the manufacturing process can be simplified to effectively reduce the production cost.

The first flange 12 is protruded from the inner wall surface 11 of the first base 10 to form a stepped shape. An inner side of the first limit slot 13 surrounded by the first flange 12 is extended and connected to the bottom of first limit slot 13, and the bottom of the first limit slot 13 is recessed on the inner wall surface 11 to form a space for accommodating an end of the ferrite 30 and the sealing unit 50.

Similarly, the second flange 22 is protruded from the inner wall surface 12 of the second base 20 to form a stepped shape. An inner side of the second limit slot 23 surrounded by the second flange 22 is extended and connected to the bottom of the second limit slot 23, and the bottom of the second limit slot 23 is recessed on the inner wall surface 21 to form a space for accommodating an end of the ferrite 30 and the sealing unit 50.

The thickness and height of the first flange 12 and the second flange 22 can be designed according to the electrical properties such as the frequency required for the actual application. Due to the configuration of the first flange 12 and the second flange 22 and the matching of the sealing unit 50, there is no gap between the ferrite 30 and the inner wall surface 11 of the first base 10 at the top, and between the ferrite 30 and the inner wall surface 21 of the second base 20 at the bottom for the signals transmitted in the channel, and thus signals of other undesired modes will not be excited, and effective suppression can be obtained to effectively improve the stability and performance of the system, and achieve the effects of convenient positioning and reduced manufacturing cost.

In an embodiment, the accommodating space formed by the first limit slot 13 and the second limit slot 23 substantially match the shape of the end of the ferrite 30, and the gap formed between the ferrite 30 and the first limit slot 13 or the second limit slot 23 can be filled by the sealing unit 50. The sealing unit 50 can be an adhesive layer made of Teflon, and the sealing unit 50 is only shown in FIG. 2, but omitted in FIGS. 3 and 4.

In this embodiment, the bottom of first limit slot 13 is recessed on the inner wall surface 11 of the first base 10, so that the distance from the top of the first flange 12 to the bottom of first limit slot 13 is greater than the distance from the top of the first flange 12 to the inner wall surface 11 of the first base 10. Similarly, the bottom of the second limit slot 23 is recessed on the inner wall surface 21 of the second base 20, so that the distance from the top of the second flange 22 to the bottom of the second limit slot 23 is greater than the distance from the top of the second flange 22 to the inner wall surface 21 of the second base 20.

After the first base 10 and the second base 20 are assembled with each other, the distance D from the bottom of first limit slot 13 to the bottom of the second limit slot 23 is greater than the height H1 of the channels C1, C2, C3. For the reasons of assembly convenience and mechanical tolerance, the distance D from the bottom of first limit slot 13 to the bottom of the second limit slot 23 is preferred designed to be slightly greater than the height H2 of the ferrite 30.

In FIGS. 3 and 4, the outer wall surface 14 of the first base 10 has an outer groove 15 for accommodating the limit magnet 40, and the outer wall surface 24 of the second base 20 also has an outer groove 25 for accommodating the limit magnet 40. As shown in the figures, the limit magnet 40 is configured to be corresponsive to the inner ferrite 30, so that the outer groove 15 outside the first base 10 is also configured to be corresponsive to the first limit slot 13 inside, and the outer groove 25 outside the second base 20 is also configured to be corresponsive to the inner second limit slot 23. In other words, the wall thickness of the first base 10 is thinner at the position where the outer groove 15 or the first limit slot 13 is located; and the wall thickness of the second base 20 is thinner at the position where the outer groove 25 or the second limit slot 23 is located is thinner, so that the design of this disclosure further helps to increase the attraction force generated by the limit magnet 40 to the ferrite 30 by magnetism.

In summation of the description above, the gapless ferrite structure for circulator or isolator of this embodiment is formed by the first limit slot having a first flange formed on the inner wall surface of the first base, and the second limit slot having a second flange formed on the inner wall surface of the second base. The slots are provided for accommodating the two ends of the ferrite respectively, so that the gapless structure is formed on the signal transmission path and can meet the application requirements of high-performance communication system equipment. In addition, the gapless structure can also isolate metal foreign substances to avoid them from being adsorbed on the ferrite.

While the disclosure has been described by means of specific embodiments, numerous modifications and variations could be made thereto by those skilled in the art without departing from the scope and spirit of the disclosure set forth in the claims.

What is claimed is:

1. A gapless ferrite structure for circulator or isolator, comprising:

a first base, comprising a first flange disposed on an inner wall surface of the first base and a first limit slot surrounded by the first flange;

a second base, assembled with the first base to form an internal space, and comprising a second flange disposed on an inner wall surface of the second base and a second limit slot surrounded by the second flange;

a ferrite, with two ends accommodated in the first limit slot and the second limit slot respectively;

two limit magnets, installed on the first base and the second base respectively and configured to be corresponsive to the ferrite for generating an attraction force on the ferrite; and two sealing units, configured between an end of the ferrite and the first limit slot and between the other end of the ferrite and the second limit slot respectively, wherein an outer wall surface of each of the first base and the second base is respectively provided with an outer groove for individually accommodating each of the two limit magnets.

2. The gapless ferrite structure for circulator or isolator according to claim 1, further comprising a plurality of channels formed between the first base and the second base, and the distance from the bottom of the first limit slot to the bottom of the second limit slot is greater than the height of the channels.

3. The gapless ferrite structure for circulator or isolator according to claim 2, wherein the distance from the bottom of the first limit slot to the bottom of the second limit slot is slightly greater than the height of the ferrite.

4. The gapless ferrite structure for circulator or isolator according to claim 1, wherein the distance from the top of the first flange to the bottom of the first limit slot is greater than the distance from the top of the first flange to the inner wall surface of the first base, and the distance from the top of the second flange to the bottom of the second limit slot is greater than the distance from the top of the second flange to the inner wall surface of the second base.

5. The gapless ferrite structure for circulator or isolator according to claim 4, wherein the distance from the bottom of the first limit slot to the bottom of the second limit slot is slightly greater than the height of the ferrite.

6. The gapless ferrite structure for circulator or isolator according to claim 5, wherein the ferrite is a cylindrical or polygonal columnar structure.

7. The gapless ferrite structure for circulator or isolator according to claim 6, wherein the two sealing units are adhesive layers.

* * * * *